United States Patent [19]

Coco et al.

[11] Patent Number: 5,780,184
[45] Date of Patent: Jul. 14, 1998

[54] NEGATIVE ELECTRODE FOR AN ALKALINE CELL

[75] Inventors: Isabelle Coco, Talence Cedex; Jean-Michel Cocciantelli, Bordeaux; Jean-Jacques Villenave, Talence Cedex, all of France

[73] Assignee: SAFT, Romainville, France

[21] Appl. No.: 668,315

[22] Filed: Jun. 26, 1996

Related U.S. Application Data

[63] Continuation-in-part of Ser. No. 429,221, Apr. 25, 1995, abandoned.

[30] Foreign Application Priority Data

Apr. 24, 1995 [FR] France .................. 95 04871

[51] Int. Cl.⁶ .............................. H01M 4/62; H01M 4/58
[52] U.S. Cl. .......................... 429/217; 429/59; 429/223
[58] Field of Search ........................ 429/217, 59, 223

[56] References Cited

U.S. PATENT DOCUMENTS

| | | | |
|---|---|---|---|
| 3,954,506 | 5/1976 | Sullivan | 429/217 |
| 4,551,401 | 11/1985 | Wilson | 429/217 X |
| 4,814,242 | 3/1989 | Maxfield et al. | 429/217 |
| 5,378,560 | 1/1995 | Tomiyama | 429/217 |
| 5,565,284 | 10/1996 | Koga et al. | 429/194 X |

*Primary Examiner*—John S. Maples
*Attorney, Agent, or Firm*—Sughrue, Mion, Zinn, Macpeak & Seas, PLLC

[57] ABSTRACT

The present invention concerns a negative electrode for an alkaline cell, comprising a current collector supporting a paste containing an electrochemically active material and a binder, characterized in that said binder is a polymer containing hydrophilic and hydrophobic groups, said polymer being selected from an acrylic homopolymer, copolymer and terpolymer, an unsaturated organic acid copolymer and an unsaturated acid anhydride copolymer.

7 Claims, 1 Drawing Sheet

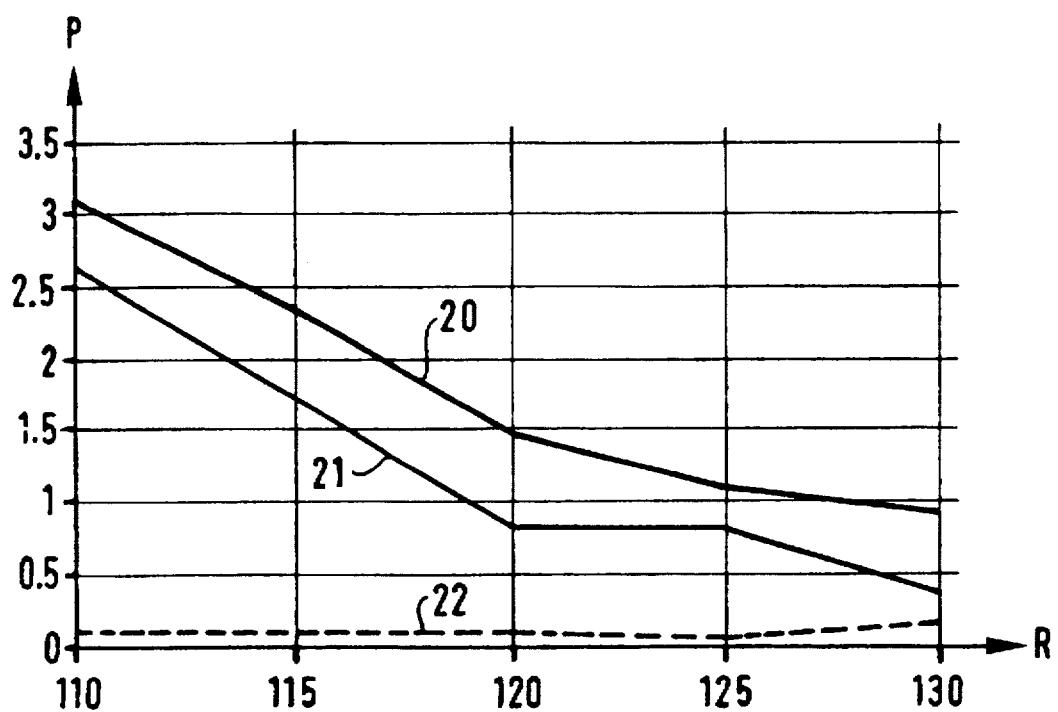

NEGATIVE ELECTRODE FOR AN ALKALINE CELL

This is a Continuation-in-Part of application Ser. No. 08/429,221 filed Apr. 25, 1995 now abandoned.

The present invention concerns a negative electrode for an alkaline cell, in particular the binder used for its production.

A paste type negative electrode for an alkaline cell is composed of a support acting as a current collector and having coated thereon a paste constituted by powdered electrochemically active material, a binder, and frequently a conducting material. The binder ensures cohesion of the grains of active material between themselves and on the electrode support both before assembly of the cell and during its operation.

The electrochemically active surface area of an electrode depends on the area which is wetted by the electrolyte. If the electrode is insufficiently wetted, its active surface area is reduced, increasing the local current density, and its charged capacity is smaller. Thus the binder must also promote the wettability of the electrode by the electrolyte.

In sealed cells, recombination of the oxygen generated during overcharging occurs at the negative electrode. This reaction is essential for preventing an increase of pressure in the cell. To obtain high recombination efficiency, it is necessary to have triphase meniscusses at the negative electrode. These meniscusses form when the electrode has a hydrophobic character. In a metal-hydride cell, this hydrophobic character also allows reabsorption of the hydrogen by a solid-gas mechanism.

Also in the case of the Ni-MH battery. The binder must maintain electrical contact among the crystals of the hydrogen-combinable alloy. A loss of conductivity of the MH electrode can never be recovered, contrary to what occurs, for example, with respect to a cadmium or zinc electrode.

During battery cycling, the hydrogen-combinable alloy absorbs and desorbs hydrogen in succession, thereby causing the partition thereof and an increase of the electrode volume. Accordingly, the binder must be capable of accompanying and restricting the increase of electrode volume as the electrode ages.

The binder thus has a large influence on the properties of the negative electrode, associated with its covering power and its permeability to gas. Known electrodes have used the following binders:

- fluorinated resins: these have a marked hydrophobic character which renders impregnation of the electrode and electrolyte retention difficult. In addition, they only behave well mechanically at the electrode at concentrations of greater than 3%, which considerably reduces performance on rapid discharge (T Sakai et. al., J. Less. Common Met., 172–174 (1991), 1185–1193);
- cellulose derivatives: these have good thickening and adhesive properties but intergranular cohesion is not retained after rolling and when operating in the electrolyte (degradation of adhesive properties);
- a poly(vinyl pyrrolidone): good electrochemical efficiencies can be obtained but a rigid and fragile electrode is produced, precluding any calibration operation involving rolling;
- thermoplastic elastomers: electrochemical capacity is good but mechanical behavior is poor (T. Hara et. al., J. Electrochem. Soc., 140, 9 (1993), 2450–2454).

Furthermore, numerous polymers, such as vinyl polymers, are known for their low degree of permeability to hydrogen, this permeability being:

polyvinyl acetate: $6.84 \times 10^{-13}$ cm$^2$.s.Pa at 30° C., polyvinyl chloride: $1.3 \times 10^{-13}$ cm$^2$.s.Pa at 25° C.

The present invention provides a negative electrode for an alkaline cell which has high performance during a prolonged lifetime.

The present invention is further intended to disclose an electrode in which the binder possesses excellent permeability to hydrogen and ensures the mechanical strength of the electrode.

The object of the present invention is a negative electrode for an alkaline Ni-MH battery, comprising a current collector supporting a paste containing a hydrogen-combinable alloy and a binder, this electrode being characterized by the fact that said binder is a polymer containing hydrophilic and hydrophobic groups, said polymer comprising non-ionic aliphatic groups exclusively, an unsaturated organic acid copolymer, and an unsaturated acid anhydride copolymer.

By using polymers which combine hydrophobic and hydrophilic characters as binders for the negative electrode, the invention provides an electrode with good cohesion which is readily wettable by the electrolyte and which permits gas absorption/desorption of hydrogen. Preferably, the number-average molar mass of the polymer is between 1,000 and 1,000,000.

The acrylic polymers according to the invention must contain no aromatic groups, such as, for example, a styrene group.

The acrylic polymers according to the invention must contain no ionic groups, because the polymers would then lose their adhesive properties. Acrylic polymers comprising ionic groups are habitually used as thickening agents.

Acrylic polymers normally possess a low degree of permeability to hydrogen. It was observed, surprisingly, that the acrylic homopolymers, copolymers, and terpolymers according to the invention did not impede the reaction in which hydrogen was reabsorbed by the hydrogen-combinable alloy. Accordingly, the binder according to the invention preserves in its totality the accessibility of the hydrogen.

In a preferred embodiment, a polymer is used which is selected from a homopolymer (I), a copolymer (II) and a terpolymer (III) of an acrylate or methacrylate.

In a first embodiment, the polymer is a homopolymer (I) of an acrylate or methacrylate, with general formula:

where:

$R_1$ is selected from hydrogen H and a methyl group $CH_3$, and

R' is a non functional alkyl group selected from a methyl group $CH_3$, ethyl group $CH_2$—$CH_3$, butyl group $(CH_2)_3$—$CH_3$ and 2-ethylhexyl group $CH_2$—CH$(C_2H_5)$—$(CH_2)_3$—$CH_3$, or an alkyl functional group selected from a hydroxyethyl group $CH_2$—$CH_2OH$ and an aminoalkyl group, and n is such that the average molar weight of said homopolymer lies in the range 1,000 to 1,000,000.

The fact that the acrylic polymer incorporates no ionic group signifies that R' must not be hydrogen or a salt-forming cation, for example K+, Na+, etc.

In a second embodiment, the polymer is a copolymer (II) of an acrylate or methacrylate, with general formula:

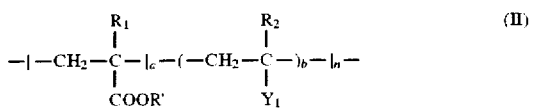

where:

- $R_1$ and $R_2$ are independently selected from hydrogen and a methyl group;
- R' is a non functional alkyl group selected from a methyl, ethyl, butyl and 2-ethylhexyl group, or an alkyl functional group selected from a hydroxyethyl and an aminoalkyl group,
- $Y_1$ is selected from hydrogen, a halogenated group, an alkoxy group $O-CH_3$, an acetate group $O-CO-CH_3$, an ester group, a non functional alkyl group selected from a methyl, ethyl, butyl and 2-ethylhexyl group, and a functional alkyl group selected from a hydroxyethyl and an aminoalkyl group,
- the ratio a/b lies in the range 0.1 to 0.9, and
- n is such that the average molar weight of said homopolymer lies in the range 1.000 to 1.000.000.

When $Y_1$ is an ester group, it is preferably of the form COOR" where R" is hydrogen, a non functional alkyl group selected from a methyl, ethyl, butyl and 2-ethylhexyl group, or a functional alkyl group selected from a hydroxyethyl and an aminoalkyl group. In a third embodiment, the polymer is a terpolymer (III) of an acrylate or methacrylate, with general formula:

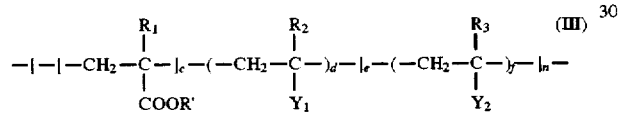

where:

- $R_1$, $R_2$ and $R_3$ are independently selected from hydrogen and a methyl group;
- R' is a non functional alkyl group selected from a methyl, ethyl, butyl and 2-ethylhexyl group, or an alkyl functional group selected from a hydroxyethyl and an aminoalkyl group,
- $Y_1$ and $Y_2$ are independently selected from hydrogen, a halogenated group, an alkoxy group, an acetate group, an ester group, a non functional alkyl group selected from a methyl, ethyl, butyl and 2-ethylhexyl group, and a functional alkyl group selected from a hydroxyethyl and an aminoalkyl group,
- the ratio c/d lies in the range 0.1 to 0.9,
- the ratio e/f lies in the range 0.1 to 0.9, and
- n is such that the average molar weight of said homopolymer lies in the range 1.000 to 1.000.000.

When $Y_1$ and/or $Y_2$ are independently an ester group, it is preferably of the form COOR" where R" is hydrogen, a non functional alkyl group selected from a methyl, ethyl, butyl and 2-ethylhexyl group, or a functional alkyl group selected from a hydroxyethyl and an aminoalkyl group.

In a further embodiment, the binder is a copolymer of an unsaturated organic acid (IV) with general formula:

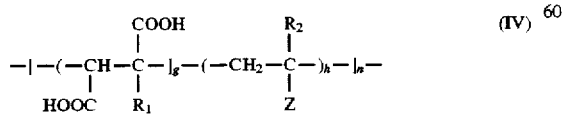

where:

- $R_1$ and $R_2$ are independently selected from hydrogen and a methyl group;
- Z is selected from hydrogen, a halogenated group, an alkoxy group, an ester group, an acetate group, a non functional alkyl group selected from a methyl, ethyl, butyl and 2-ethylhexyl group, a functional alkyl group selected from a hydroxyethyl and an aminoalkyl group, and a monovalent radical derived from a benzene ring which may be substituted in the para position by a group selected from a halogenated, alkoxy, acetate and ester group, a non functional alkyl group selected from a methyl, ethyl, butyl and 2-ethylhexyl group, and a functional alkyl group selected from a hydroxyethyl and an aminoalkyl group,
- the ratio g/h lies in the range 0.1 to 0.9, and
- n is such that the average molar weight of said homopolymer lies in the range 1.000 to 1.000.000.

When Z is selected from an ester group and a benzene ring substituted in the para position by an ester group, said ester group is preferably of the form COOR" where R" is hydrogen, a non functional alkyl group selected from a methyl, ethyl, butyl and 2-ethylhexyl group, or a functional alkyl group selected from a hydroxyethyl and an aminoalkyl group.

Preferably, the organic acid is selected from fumaric acid (V), mesaconic acid (VI) and itaconic acid (VII):

In a further embodiment, the binder is a copolymer of an unsaturated acid anhydride (VIII) with general formula:

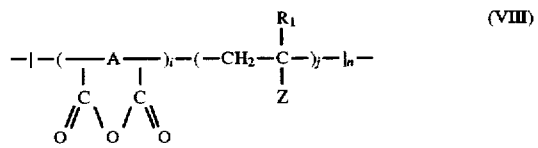

where:

- $R_1$ is selected from hydrogen and a methyl group;
- A is a quadrivalent radical selected from an alkylidene group and a cycloalkylene group, and
- Z is selected from hydrogen, a halogenated group, an alkoxy group, an ester group, an acetate group, a non functional alkyl group selected from a methyl, ethyl, butyl and 2-ethylhexyl group, a functional alkyl group selected from a hydroxyethyl and an aminoalkyl group, and a monovalent radical derived from a benzene ring which is optionally substituted in the para position by a group selected from a halogenated, alkoxy, acetate and ester group, a non functional alkyl group selected from a methyl, ethyl, butyl and 2-ethylhexyl group, and a functional alkyl group selected from a hydroxyethyl and an aminoalkyl group,
- the ratio i/j lies in the range 0.1 to 0.9, and
- n is such that the average molar weight of said homopolymer lies in the range 1.000 to 1.000.000.

When Z is selected from an ester group and a benzene ring substituted in the para position by an ester group, said ester group is preferably of the form COOR" where R" is hydrogen, a non functional alkyl group selected from a methyl, ethyl, butyl and 2-ethylhexyl group, or a functional alkyl group selected from a hydroxyethyl and an aminoalkyl group.

Preferably, the acid anhydride is selected from maleic anhydride (IX) and tetrahydrophthalic anhydride (X):

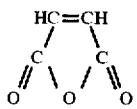   (IX)

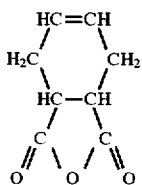   (X)

Advantageously, the unsaturated acid anhydride copolymer is esterified, saponified and/or partially neutralized to alter its wettability. Esterification can, for example, allow radicals whose quantity and nature substantially alter the properties of the binder and the electrode to be grafted on. Without limiting the present invention, this can be interpreted as reducing the hydrophobic character of the binder by selecting the radical from low molecular weight, non functional alkyl groups. Thus, for example, the hydrophilic character of the polyacrylates increases when their alkoxy group is of lower molecular weight. By controlling the properties of the binder, the hydrophilic character of the electrodes can be controlled.

The present invention also provides a method of producing a negative electrode for an alkaline cell, comprising a current collector supporting a paste containing an electrochemically active material and a binder. The paste is formed by adding the binder in a dispersed form to the active material in suspension in a liquid medium as follows.

The active material in powder form is placed in suspension in an aqueous liquid with stirring. Known thickening agents such as polyethers, cellulose compounds or carboxylic acid derivatives, can be added to the suspension. The binder is introduced into the suspension, for example in the form of an aqueous emulsion which is readily and homogeneously dispersible in the paste.

The use of organic solvents is prohibited. Residual traces of solvent may remain in the electrode, and these traces have adverse consequences for the functioning of the battery.

The paste is deposited on a support which acts as a current collector, for example a metallic support that is three dimensional, of the expanded type, or two dimensional such as a strip.

The binder used in the present invention has the following advantages:

ease of producing the electrodes: since many polyacrylates are available as an aqueous emulsion or are emulsifiable, electrode production by forming a wet paste followed by drying is facilitated (stable paste with good rheological properties);

dimensional stability: a small amount of binder (at most 0.5%) is sufficient to ensure cohesion of the electrodes and to retain excellent flexibility;

improvement of rapid discharge performance by the use of binders which promote permeability of hydroxyl ions;

pressure modulation of sealed cells: since the operating pressure can be reduced, the quantity of electrolyte can be increased, thus increasing the lifetime of sealed cells.

The invention will be better understood, and other advantages and features will appear, from the following examples of embodiments which are given by way of non limiting illustration, and from the accompanying drawing in which the single figure shows the relationships both between the electrolyte filling factor and the total pressure and between the electrolyte filling factor and the hydrogen pressure within a cell including a negative electrode containing a binder of the present invention.

In the figure, the pressure P in bars is shown as the ordinate and the filling factor R in % is shown as the abscissa, as an excess over the normal filling factor (100%).

EXAMPLE 1 Prior Art

A negative electrode A for a prior art alkaline cell was produced as follows. The paste was composed of 99.4% by weight of active material, 0.3% by weight of a cellulose binder, hydroxypropylmethyl cellulose (HPMC), and 0.3% of carbon as a conductor.

The active material was a "Mischmetal" type hydridable alloy in powder form with formula $AB_5$ substituted with Mn, Al and Co.

The powdered active material was placed in suspension by stirring in water. The binder in powder form was slowly added to the suspension, with stirring. The paste obtained was deposited on an expanded nickel support. The electrode was dried then rolled.

The electrode obtained was rigid and had poor mechanical behavior during manipulation (touching, rubbing, rolling, cutting, folding, etc. . . ) which caused breaks or a loss of active material.

EXAMPLE 2 Prior Art

A negative electrode B for a prior art alkaline cell was produced in analogous fashion to Example 1, with the exception that the binder was polyvinyl alcohol (PVA).

The electrode was produced in analogous fashion to Example 1 with the exception that the binder was added to the suspension of active material in the form of an aqueous emulsion, with stirring.

The electrode was rigid and had poor mechanical behavior during manipulation, analogous to that observed for the electrode of Example 1.

EXAMPLE 3

A negative electrode C for an alkaline cell in accordance with the prior art was produced in analogous fashion to Example 2, with the exception that the binder was poly(vinyl pyrrolidone) (PVP).

The electrode was rigid and had poor mechanical behavior during manipulation, manifested by a loss of intergranular cohesion and adherence to the support.

EXAMPLE 4

A negative electrode D for an alkaline cell of the present invention was produced as follows. The paste was composed of 98.9% by weight of active material, 0.5% by weight of binder, 0.3% of carbon as a conductor and 0.3% by weight of a cellulose type thickening agent.

The active material was analogous to that of Example 1. The binder was a polyacrylate homopolymer (I) in which R' was an ethyl group.

The powdered active material and the carbon were placed in suspension by stirring in water containing the thickening agent. An aqueous emulsion of binder was added to the suspension with stirring. The paste obtained was deposited on an expanded nickel support. The electrode was dried then rolled.

The electrode was flexible and had good mechanical behavior during processing.

EXAMPLE 5

A negative electrode E for an alkaline cell of the present invention was produced in analogous fashion to Example 5, with the exception that the binder was a polyacrylate homopolymer (I) in which R' was a 2-ethylhexyl group.

EXAMPLE 6

Electrodes A to E produced as above were evaluated in an open Ni-MH cell.

The positive electrode was nickel hydroxide based, on a nickel sponge support. The nickel hydroxide was doped with less than 15% of Co and Zn hydroxide. The electrodes were separated by a separator impregnated with 8.7N potassium hydroxide KOH as the electrolyte. The separator was a non woven polyolefin copolymer.

Negative electrodes A to E produced as above were each placed in the cell opposite the nickel electrode from which it was separated by the separator; the ensemble was impregnated with electrolyte. The cell was designed to have excess capacity at the positive electrode to enable testing of the negative electrode alone, the capacity of which limited that of the cell. The cell was cycled under the following conditions:

- charge at C (C being the theoretical capacity of the cell) for 52 minutes.
- discharge at C for 48 minutes, with the exception of the first ten cycles and cycle 700 (capacity measurement) which were conducted as follows:
- charge at C/5 for 7.5 hours,
- discharge at C/5 to a stop voltage of 1 V.

The capacities were measured during discharge at C/5, firstly at the fourth cycle and then at cycle 700. The capacities are expressed in mAh/g with respect to the active material. These are shown in Table I below.

TABLE I

| Electrode | Cycle 4 | Cycle 700 |
|---|---|---|
| A | 280 | — |
| B | 260 | — |
| C | 260 | 230 |
| D | 290 | 280 |
| E | 290 | 280 |

The performances of the electrodes of the present invention were better than those of the prior art electrodes, and ageing was slower.

EXAMPLE 7

Electrodes D and E produced as above were each placed in a sealed cell comprising the same components (positive electrode, separator, electrolyte) as described in Example 6. The cell was cycled under similar conditions to those used in Example 6.

The operating pressures of oxygen and hydrogen were observed after 7 hours of charging at C/5. The results, in bars, are shown in Table II below.

TABLE II

| Electrode | $H_2$ | $O_2$ |
|---|---|---|
| D | 6.0 | 3.3 |
| E | 4.0 | 1.0 |

When a polyacrylate homopolymer in which R' was a 2-ethylhexyl group as a binder was used, the oxygen pressure was three times less than with a binder of the same type in which R' was an ethyl group, and the hydrogen pressure was twice as low. The operating pressure of the cells during charging and overcharging can thus be altered and regulated by altering the nature of the alkoxy group in the polyacrylates.

EXAMPLE 9

Electrode E obtained above was placed in a sealed cell which was analogous to that described in Example 7, however in this case it was provided with a means for recombining the oxygen to keep the oxygen pressure to an insignificant value (curve 22).

In the case of a binder in accordance with the invention, the single figure shows the relationship between the filling factor and the total pressure (curve 20) and between the filling factor and the hydrogen pressure (curve 21).

The quantity of electrolyte introduced into the cell can thus be increased with respect to the prior art (100%) without excessive increases in the operating pressure. The lifetime of the cell was also prolonged. One of the causes of limitation of the lifetime of a cell is electrolyte consumption. The lifetime is directly correlated to the quantity of electrolyte which can be introduced into the cell. The importance of the electrode of the present invention is thus clearly demonstrated.

EXAMPLE 10

Two negative electrodes F and G for Ni-MH batteries according to the present invention were produced in the following way. The paste consisted of 98.9% by weight active substance, 0.5% by weight binder, 0.3% conductive powder, and 0.3% cellulose thickening agent.

The active substance was a hydrogen-combinable alloy comparable to that in Example 1.

The binder was an unsaturated acid copolymer, a styrene/maleic anhydride copolymer used in electrode F and a vinyl ether/maleic anhydride copolymer used in electrode G, respectively.

The powdered active substance and the carbon were placed in suspension by stirring in water containing the thickening agent. The powdered binder was added to the suspension while stirring. The paste thus obtained was deposited on a spread-out nickel substrate. The electrode was dried, then rolled.

The electrode was flexible and exhibited good mechanical strength when handled.

Electrodes F, G, and C as previously manufactured and placed in a ventilated Ni-MH battery such as that described in Example 6 were evaluated.

The electrochemical test was conducted under the conditions set forth in Example 6, except for the fact that the outputs were measured during C/5 discharge, a first time during the ninth cycle and a second time during cycle 600. Outputs are expressed in mAh/g in relation to the active substance and reported in Table III, below.

TABLE III

| Electrode | Cycle 9 | Cycle 600 |
|---|---|---|
| F | 291 | 275 |
| G | 290 | 276 |
| C | 260 | 230 |

Electrodes F and G according to the invention gave performance levels greater than those of electrode C, and they aged less (5%) than the electrode according to prior art (11%).

The present invention is not limited to the embodiments described but can be varied by the skilled person without departing from the ambit of the invention. In particular, the invention is applicable to any electrochemical cell containing a liquid alkaline electrolyte. Without limiting the scope of the invention, the active material of the negative electrode may be, for example: iron, cadmium, zinc, or a hydridable alloy of type $AB_\alpha$ where $1 \leq \alpha \leq 2.5$, or $AB_5$. The positive electrode is generally based on nickel hydroxide inserted in a three dimensional conducting support which can be sintered, a felt, or a sponge. The nickel hydroxide which is normally used can be doped with a hydroxide of another metal in a proportion of less than 10%, such as Co, Cd, Zn, Ca, Mg and/or Mn; these grains can be spherical or irregular in shape. The electrodes are separated by a separator which is impregnated with the liquid alkaline electrode. The most frequently used separators are woven or non woven, or polymer based microporous membranes.

We claim:

1. A negative electrode for a Ni-MH alkaline cell, comprising a current collector supporting a paste containing a hydrogen-combinable alloy and a binder, wherein said binder is a polymer containing hydrophilic and hydrophobic groups, wherein said polymer is an acrylic homopolymer containing non-ionic aliphatic groups exclusively, an acrylic copolymer containing non-ionic aliphatic groups exclusively, or an acrylic terpolymer containing non-ionic aliphatic groups exclusively.

2. An electrode according to claim 1, in which said polymer is an acrylic or methacrylic homopolymer with repeating unit:

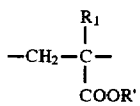 (I)

where:

$R_1$ is hydrogen or a methyl group, and

R' is a non functional alkyl group selected from the group consisting of a methyl group, an ethyl group, a butyl group and a 2-ethylhexyl group, or R' is an alkyl functional group selected from the group consisting of a hydroxyethyl group and an aminoalkyl group.

3. An electrode according to claim 1, in which said polymer is an acrylic or a methacrylic copolymer with repeating unit:

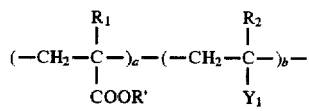 (II)

where:

$R_1$ and $R_2$ are, independently hydrogen or a methyl group;

R' is a non functional alkyl group selected from the group consisting of a methyl group, an ethyl group, a butyl group and a 2-ethylhexyl group, or R' is an alkyl functional group selected from the group consisting of a hydroxyethyl group and an aminoalkyl group.

$Y_1$ is hydrogen, a halogenated group, an alkoxy group, an acetate group, or an ester group, or $Y_1$ is a non functional alkyl group selected from the group consisting of a methyl group, an ethyl group, a butyl group and a 2-ethylhexyl group, or $Y_1$ is a functional alkyl group selected from the group consisting of a hydroxyethyl group and an aminoalkyl group, the ratio a/b is in the range 0.1 to 0.9.

4. An electrode according to claim 3, in which $Y_1$ is an ester group COOR" where R" is hydrogen, a non functional alkyl group selected from the group consisting of a methyl group, an ethyl group, a butyl group and a 2-ethylhexyl group, or a functional alkyl group selected from the group consisting of a hydroxyethyl group and an aminoalkyl group.

5. An electrode according to claim 1, in which said polymer is an acrylic or a methacrylic terpolymer with repeating unit:

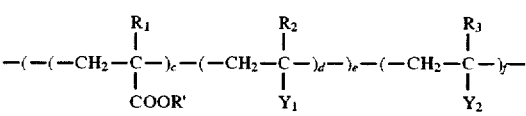

where $R_1$, $R_2$ and $R_3$ are, independently, hydrogen or a methyl group;

R' is a non functional alkyl group selected from the group consisting of a methyl group, an ethyl group, a butyl group and a 2-ethylhexyl group, or R' is an alkyl functional group selected from the group consisting of a hydroxyethyl group and an aminoalkyl group.

$Y_1$ and $Y_2$ are, independently, hydrogen, a halogenated group, an alkoxy group, an acetate group, an ester group, a non functional alkyl group selected from the group consisting of a methyl group, an ethyl group, a butyl group and a 2-ethylhexyl group, or a functional alkyl group selected from the group consisting of a hydroxyethyl group and an aminoalkyl group, the ratio c/d is in the range 0.1 to 0.9, the ratio e/f is in the range 0.1 to 0.9.

6. An electrode according to claim 5, in which $Y_1$ and/or $Y_2$ are independently an ester group COOR" where R" is hydrogen, a non functional alkyl group selected from the group consisting of a methyl group, an ethyl group, a butyl group and a 2-ethylhexyl group, or a functional alkyl group selected from the group consisting of a hydroxyethyl group and an aminoalkyl group.

7. An Ni-MH alkaline cell, comprising a negative electrode comprising a current collector supporting a paste containing a hydrogen-combinable alloy and a binder, wherein said binder is a polymer containing hydrophilic and hydrophobic groups, wherein said polymer is an acrylic homopolymer, an acrylic copolymer, or an acrylic terpolymer containing non-ionic aliphatic groups exclusively.

* * * * *